(12) United States Patent
Robinson et al.

(10) Patent No.: US 10,891,099 B2
(45) Date of Patent: Jan. 12, 2021

(54) CAUSING MOVEMENT OF AN INTERACTION WINDOW WITH A TABLET COMPUTING DEVICE

(71) Applicant: Hewlett-Packard Development Company, L.P., Houston, TX (US)

(72) Inventors: Ian N. Robinson, Pebble Beach, CA (US); Daniel G. Gelb, Redwood City, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/072,141

(22) PCT Filed: Apr. 29, 2016

(86) PCT No.: PCT/US2016/030163
§ 371 (c)(1),
(2) Date: Jul. 23, 2018

(87) PCT Pub. No.: WO2017/188998
PCT Pub. Date: Nov. 2, 2017

(65) Prior Publication Data
US 2019/0034153 A1 Jan. 31, 2019

(51) Int. Cl.
*G06F 3/14* (2006.01)
*G06F 3/03* (2006.01)
(Continued)

(52) U.S. Cl.
CPC .......... *G06F 3/1454* (2013.01); *G06F 3/0317* (2013.01); *G06F 3/03545* (2013.01);
(Continued)

(58) Field of Classification Search
CPC .... G06F 3/1446; G06F 3/1454; G06F 3/0346; G06F 3/0354–03544; G06F 3/04886;
(Continued)

(56) References Cited

U.S. PATENT DOCUMENTS 8,937,590 B2   1/2015 Hachiya et al.
9,053,250 B2   6/2015 Halim et al.
(Continued)

OTHER PUBLICATIONS

Cauchard et al.—Towards Mobile Multi-display Environment—Jun. 2013—< http://web.stanford.edu/~cauchard/papers/PhD_JCauchard_2013.pdf >.

*Primary Examiner* — Gene W Lee
(74) *Attorney, Agent, or Firm* — Dicke Billig & Czaja PLLC

(57) ABSTRACT

In one example, a computing system includes a first computing device including a first display having a moveable interaction window that is a subset of an entire display area of the first display, the first computing device to wirelessly transmit a video stream representing at least the interaction window. The computing system includes a tablet computing device including a second display, the tablet computing device to wirelessly receive the video stream and display content of the interaction window on the second display and cause movement of the interaction window on the first display based on movement of the tablet computing device.

14 Claims, 3 Drawing Sheets

(51) Int. Cl.
*G09G 5/14* (2006.01)
*G06F 3/0354* (2013.01)
*G06F 3/041* (2006.01)
*G06F 3/0488* (2013.01)

(52) U.S. Cl.
CPC ............ *G06F 3/041* (2013.01); *G06F 3/0416* (2013.01); *G06F 3/04886* (2013.01); *G09G 5/14* (2013.01); *G06F 2200/1614* (2013.01); *G09G 2340/0464* (2013.01)

(58) Field of Classification Search
CPC .... G06F 2200/1614; G09G 5/12; G09G 5/14; G09G 2300/026; G09G 2340/0464
See application file for complete search history.

(56) References Cited

U.S. PATENT DOCUMENTS

| | | | |
|---|---|---|---|
| 9,760,196 B2* | 9/2017 | Tsuda | G06F 3/1423 |
| 2006/0023077 A1 | 2/2006 | Alton et al. | |
| 2006/0132438 A1* | 6/2006 | Oakley | G06F 3/03544 |
| | | | 345/158 |
| 2012/0040719 A1* | 2/2012 | Lee | G06F 1/1626 |
| | | | 455/557 |
| 2012/0050331 A1* | 3/2012 | Kanda | H04N 21/440263 |
| | | | 345/649 |
| 2012/0062459 A1 | 3/2012 | Fleck | |
| 2012/0284650 A1 | 11/2012 | Chang et al. | |
| 2013/0150122 A1* | 6/2013 | Kulas | H04M 1/0264 |
| | | | 455/556.1 |
| 2014/0002471 A1* | 1/2014 | Yeo | G06T 5/00 |
| | | | 345/581 |
| 2014/0145969 A1 | 5/2014 | Deluca | |
| 2014/0149880 A1 | 5/2014 | Farouki | |
| 2014/0168271 A1* | 6/2014 | Yu | G06T 3/60 |
| | | | 345/652 |
| 2014/0223490 A1 | 8/2014 | Pan et al. | |
| 2014/0267431 A1* | 9/2014 | Sheynblat | G06F 1/1626 |
| | | | 345/659 |
| 2014/0365957 A1* | 12/2014 | Louch | G06F 3/1431 |
| | | | 715/790 |
| 2015/0180916 A1 | 6/2015 | Ahn et al. | |
| 2015/0253851 A1 | 9/2015 | Oh et al. | |
| 2015/0373123 A1 | 12/2015 | Warrick et al. | |
| 2016/0328030 A1* | 11/2016 | Kimura | G06F 1/3218 |

* cited by examiner

CAUSING MOVEMENT OF AN INTERACTION WINDOW WITH A TABLET COMPUTING DEVICE

BACKGROUND

The emergence and popularity of mobile computing has made portable electronic devices, due to compact design and light weight, a staple in today's marketplace. One such electronic device, tablet computing systems, employ touch-based input methods that allow a user to physically touch an associated display and have that touch registered as an input at the particular touch location, thereby enabling a user to interact physically with objects shown on the display of the electronic device. Conversely, desktop computing systems generally include a keyboard for allowing a user to manually input information (e.g., characters) into the computer system, and a mouse for selecting or highlighting items shown on an associated display unit.

DETAILED DESCRIPTION

Figure 1:
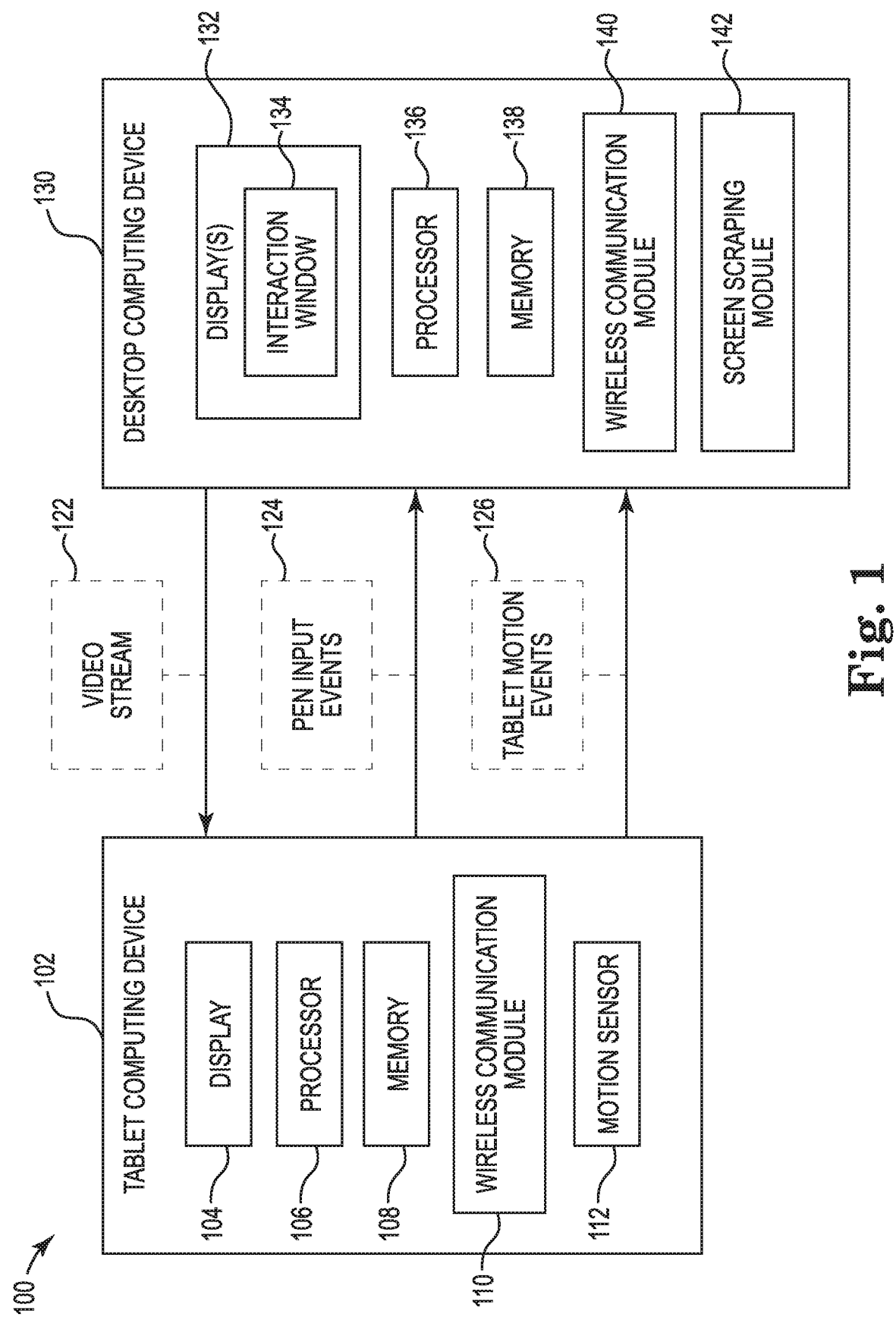
FIG. 1 is a block diagram illustrating a computing system according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Users of pen-based tablets would like the same style of interaction with applications on their desktop machine. Touch and pen-based interactions are of special interest to many users, as are technologies that allow multiple computing devices to interoperate. These interactions may be even more beneficial in countries where it provides an easier, or more flexible, form of text entry.

Examples disclosed herein enable natural pen and touch interaction even for devices that do not have touch hardware, such as a desktop PC with a traditional monitor. The desktop PC can be paired with a tablet that supports pen and touch, even if the two devices run different operating systems, and the combination enables an intuitive interaction experience using the two devices in combination.

Some examples are directed to a method and apparatus for using a pen tablet as an input device to a desktop computing device. Some examples provide a user with the ability to use a pen-enabled tablet to wirelessly link to the desktop computing device, and enable pen-based interaction with an application on the desktop computing device. The system captures a tablet-sized region of the display of the desktop computing device, which is referred to as an interaction window, and displays content of the interaction window on the pen tablet. A user can then use the pen to interact with the tablet display, and have that interaction mirrored on the display of the desktop computing device. The user does not have to reconfigure or resize their displays. Physically moving the tablet around on the desktop causes a corresponding movement of the captured region on the display (i.e., the interaction window) of the desktop computing device.

It is noted that some examples disclosed herein do not simply allow the tablet screen to be mirrored on the second computing device, such that the user would be limited to applications that run on the tablet, and not those running on the desktop computing device. Rather, In the case of desktop machines, the desktop computing device may have more compute power, graphics hardware capabilities, and a larger display than the tablet, and examples disclosed herein allow pen-based interaction with applications running on such machines.

In some examples disclosed herein, rather than sending the entire screen of the desktop computing device to the tablet, which may involve scaling down the content or using scroll bars on the tablet so the user can adjust where they are looking in the desktop area, a tablet-sized interaction window of the desktop screen is sent to the tablet. Physical movement of the tablet itself is then used to move the interaction window around the screen of the desktop computing device. This one-to-one correspondence makes for a natural and intuitive interaction. Also the pen-based interaction is not limited by the tablet resolution, or to a fixed window on the desktop computing device.

FIG. 1 is a block diagram illustrating a computing system 100 according to one example. Computing system 100 includes a tablet computing device 102 and a desktop computing device 130. In some examples, the desktop computing device 130 is a desktop personal computer (PC). Both the tablet 102 and the desktop computing device 130 may be used together on a desk surface.

Tablet 102 includes display 104, processor 106, memory 108, wireless communication module 110, and motion sensor 112. Desktop computing device 130 includes at least one display 132, processor 136, memory 138, wireless communication module 140, and screen scraping module 142. Display 132 includes a moveable interaction window 134, which is described in further detail below with reference to FIG. 2. In some examples, processors 106 and 136 represent central processing units (CPUs), microcontrollers, microprocessors, or logic configured to execute programming instructions associated with the computing system 100. Displays 104 and 132 represents electronic visual displays configured to display images and/or graphical user interfaces for enabling interaction between a user and the corresponding devices 102 and 130. Display 104 represents a touch-based and/or pen-enabled interface and includes a graphical user interface for enabling touch-based interaction between a user and the tablet 102. In some examples, display 132 also represents a touch-based interface and includes a graphical user interface for enabling touch-based interaction between a user and the device 130. In some examples, display 104 is integrated into tablet 102, and display 132 is a separate, standalone display.

As shown in FIG. 1, tablet 102 sends pen input events 124 and tablet motion events 126 to desktop computing device 130. Desktop computing device 130 sends video stream 122 to tablet 122. In some examples, these communications are wireless communications and are accomplished using wireless communication modules 110 and 140. In other examples, these communications are wired communications, or a combination of wireless and wired communications. These communications are described in additional detail below with further reference to FIG. 2.

In some examples, the display 104 of the tablet 102 serves as a display associated with the desktop computing device 130. That is, data and information presented within the moveable interaction window 134 of the display 132 is replicated on the display 104 of the tablet 102 via data streaming over a local area network or similar wireless protocol. In this way, an operating user may have mobile access to their desktop computing device 130 through use of the tablet 102. Some examples described herein enable the tablet 102 to become a peripheral input device for the desktop computing device 130.

Computing system 100 may also have additional features/functionality. For example, computing system 100 may also include additional storage (removable and/or non-removable) including, but not limited to, magnetic or optical disks or tape. Computer-readable storage media includes volatile and nonvolatile, removable and non-removable media implemented in any suitable method or technology for storage of information such as computer readable instructions, data structures, program modules or other data. Memories 108 and 138 are an example of non-transitory computer-readable storage media (e.g., non-transitory computer-readable storage media storing computer-executable instructions that when executed by at least one processor cause the at least one processor to perform a method). Non-transitory computer-readable storage media includes RAM, ROM, EEPROM, flash memory or other memory technology, CD-ROM, digital versatile disks (DVD) or other optical storage, magnetic cassettes, magnetic tape, and magnetic disk storage or other magnetic storage devices. Any such non-transitory computer-readable storage media may be part of computing system 100.

Figure 2:
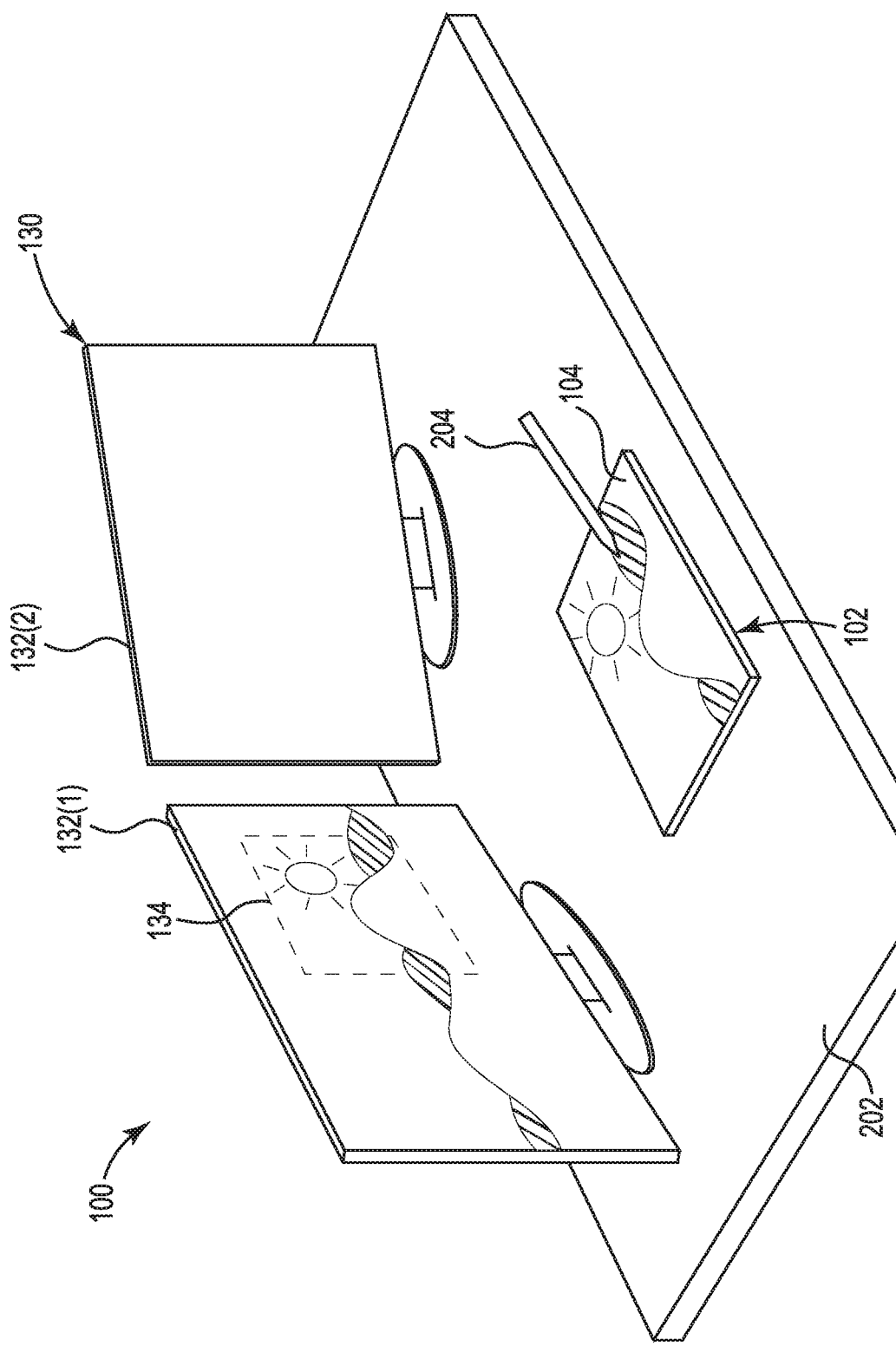
FIG. 2 is a diagram illustrating a perspective view of the computing system shown in FIG. 1 according to one example.

FIG. 2 is a diagram illustrating a perspective view of the computing system 100 shown in FIG. 1 according to one example. In the example shown in FIG. 2, the desktop computing device 130 includes multiple displays 132(1) and 132(2) (collectively referred to as displays 132), which may appear as a single extended display to the user (so the interaction window 134 can slide freely between the multiple displays 132).

The operation of computing system 100 according to some examples will now be described. First, a wireless link is initiated between the tablet 102 and the desktop computing device 130 using the wireless communication modules 110 and 140. The wireless link may be started on either device 102 or 130. Second, the desktop computing device 130 wirelessly retrieves tablet display size and resolution information (e.g., pixel resolution in x and y, and dots per inch) from the tablet 102; starts screen scraping a corresponding and equal size portion of the display 132 (initially centered on the display 132) using screen scraping module 142; and wirelessly sends the scraped region to the tablet 102 as video stream 122. Third, pen inputs to the tablet 102 via pen 204 are captured by the tablet 102 and turned into pen input events 124 at the corresponding screen location on the desktop computing device 130 (tablet x,y location+x,y location of origin of scraped region).

Fourth, sliding the tablet 102 on the desk surface 202 is sensed by motion sensor 112 and sent as dx,dy tablet motion events 126 to the screen scraping module 142 of the desktop computing device 130, which updates the location of the scraped region of the display 132. In some examples, the boundary of the scraped region of the display 132 is indicated by an outline displayed on display 132. Fifth, motion sensor 112 detects any rotations of the tablet 102. In some examples, small rotations of the tablet 102 (e.g., establishing a comfortable working angle) do not affect the orientation of the scraped region of the display 132. In some examples, rotations of 90 degrees or more cause the scraped region of the display 132 to switch between landscape and portrait modes. In other examples, small and large rotations of the tablet 102 cause an equal rotation of the scraped region of the display 132. A "canvas lock" button may be used in some examples to allow the tablet 102 to be moved to a comfortable position without changing the location of the interaction window 134.

The position of the pen 204 on the tablet 102 may be tracked by any of a variety of technologies, including capacitive, electromagnetic (EM), ultrasound, and predetermined dot patterns. An example predetermined pattern is that provided by Anoto Group AB (Lund, Sweden). Using a predetermined element pattern such as that offered by Anoto, a detector can determine its location with respect to the pattern when placed proximate the pattern. By increasing the density of the elements (i.e., increasing the dot density by decreasing the distance between the elements, and by decreasing the size of the elements themselves) the location resolution capability of the detector is increased.

The position of the tablet 102 on the desk surface 202 is tracked by motion sensor 112, and this position may be tracked relatively (like a mouse) using mechanical or optical tracking sensors (again, like a mouse), or absolutely (like a pen). For absolute tracking, some example implementations include the following: (a) An Anoto-like dot pattern on the desk surface 202 read by a sensor on, or plugged into, the tablet 102; (b) if the tablet 102 uses ultrasound to locate its pen 204, then another, separately identifiable ultrasound beacon may be attached to the desktop computing device 130; (c) a separate accessory attached to the desk surface 202 or the desktop computing device 130 may track the location of the tablet 102 using, for instance, ultrasound; (d) a marker visible to a front-facing camera on the tablet 102, e.g., overhanging the top of the display 132, may be used by the tablet 102 to calculate its position relative to the desktop computing device 130.

Some of these sensing technologies can detect the orientation of the tablet 102 with respect to the desk surface 202. This enables the rotation-based interactions mentioned above. Gross rotations of the tablet 102 may also be detected by a bearing sensor in the tablet 102.

In some examples, the tablet 102 may be capable of tracking its pen 204 when used on the display 132 of the desktop computing device 130. This allows simple interactions and markup, for instance, directly on the display 132—inside or outside of the interaction window 134. Note that even in cases where, for instance, an Anoto-like dot pattern exists on the display 132, which allows pen interaction, using the tablet 102 for pen input may still be preferable as it may afford a more comfortable, horizontal, drawing surface.

As mentioned above, screen scraping module 142 screen scrapes a portion or subset of the display 132, and the scraped region is wirelessly transmitted to the tablet 102 as video stream 122 for display on the tablet display 104. In some examples, the module 142 captures a portion of the area of display 132 as a continuous sequence of images (e.g., video stream 122). The subset of the display that is captured (i.e., the interaction window 134) may be changed dynamically based on a variety of factors. In some examples, the display resolution (e.g., dpi) of both the tablet 102 and the desktop computing device 130 may be used to provide a good mapping of captured data to the display resolution of the destination tablet 102. The relative position of the interaction window 134 within the sender's display 132 may be adjusted dynamically. In some examples, the video stream 122 corresponding to the interaction window 134 is compressed by desktop computing device 130 for transmission to the receiver tablet 102, and then the compressed video stream is transmitted over a network to the tablet 102. The tablet 102 reassembles the packets containing the compressed video stream and decompresses the video stream for display on tablet display 104.

Interaction methods such as touch and pen are captured by the tablet 102 and transmitted across a network as pen input events 124 to the desktop computing device 130 for injection. These user interface event injections take into account the relative relationships of the interaction window 134 and tablet display 104 to ensure that their effects occur at the correct locations.

In some examples, rather than capturing a dynamically changeable interaction window 134, the entire display 132 is captured and transmitted to tablet 102, and only a portion of the captured display 132 is displayed on the receiving tablet 102. In this implementation, the latency associated with updating the tablet image corresponding to movement of the interaction window 134 is reduced since the view on the tablet 102 can be adjusted dynamically on the tablet without performing round-trip communications between the tablet 102 and the desktop computing device 130, and the system may be more responsive for the user.

Additional examples may transmit a larger region than will be displayed by the tablet 102, but not the entire display 132. This allows smaller changes in the position of the tablet 102 to be responded to locally (i.e., with low latency) by the tablet 102 itself, while the larger region position is updated (higher latency).

In examples where the tablet 102 can sense pen interactions on the display 132 of the desktop computing device 130, the wireless link between the tablet 102 and the desktop computing device 130 can be initiated by tapping the display 132 with the tablet pen 204. In other examples, a near-field communication (NFC) reader may be used in the tablet 102 or pen 204 to detect a pre-assigned tag attached to the desktop computing device 130 by touching one against the other.

One example is directed to a computing system that includes a first computing device including a first display having a moveable interaction window that is a subset of an entire display area of the first display, the first computing device to wirelessly transmit a video stream representing at least the interaction window. The computing system includes a tablet computing device including a second display, the tablet computing device to wirelessly receive the video stream and display content of the interaction window on the second display and cause movement of the interaction window on the first display based on movement of the tablet computing device.

The first display may include a plurality of separate display units, and the interaction window may be moveable between the separate display units. The tablet computing device may wirelessly transmit display resolution information to the first computing device, wherein the display resolution information indicates a resolution of the second display. The first computing device may perform a screen scraping operation on a portion of the first display based on the transmitted display resolution information. The tablet computing device may receive a pen input at a location on the second display, and wirelessly transmit a pen input event for a corresponding location in the interaction window to the first computing device.

The tablet computing device may include a sensor to sense the movement of the tablet computing device, and the tablet computing device may wirelessly transmit tablet motion events to the first computing device based on the sensed movement. The tablet computing device may include a sensor to sense sliding movement of the tablet computing device against a surface, and the tablet computing device may cause sliding movement of the interaction window on the first display based on the sensed sliding movement. The tablet computing device may include a sensor to sense rotational movement of the tablet computing device, and the tablet computing device may cause rotational movement of the interaction window on the first display based on the sensed rotational movement. Sensed rotational movements below a threshold amount may cause no rotational movement of the interaction window. Sensed rotational movements above a threshold amount may cause the interaction window to switch between a landscape mode and a portrait mode. The first computing device may be operable independently of the tablet computing device in that the first computing device runs computer programs separately from the tablet computing device, and wherein the first computing device is external to and separate from the tablet computing device.

Another example is directed to a tablet computing device that includes a wireless communication module to wirelessly receive a video stream representing at least an interaction window portion of a display of first computing device. The tablet computing devices includes a display to display content of the interaction window based on the received video stream. The tablet computing devices includes at least one sensor to sense movement of the tablet computing device, wherein the wireless communication module transmits tablet motion information to the first computing device based on the sensed movement to control movement of the interaction window portion of the display of the first computing device.

The at least one sensor may sense sliding and rotational movement of the tablet computing device, and the wireless communication module may transmit tablet motion information to the first computing device based on the sensed sliding and rotational movement to control sliding and rotational movement of the interaction window portion of the display of the first computing device.

Figure 3:
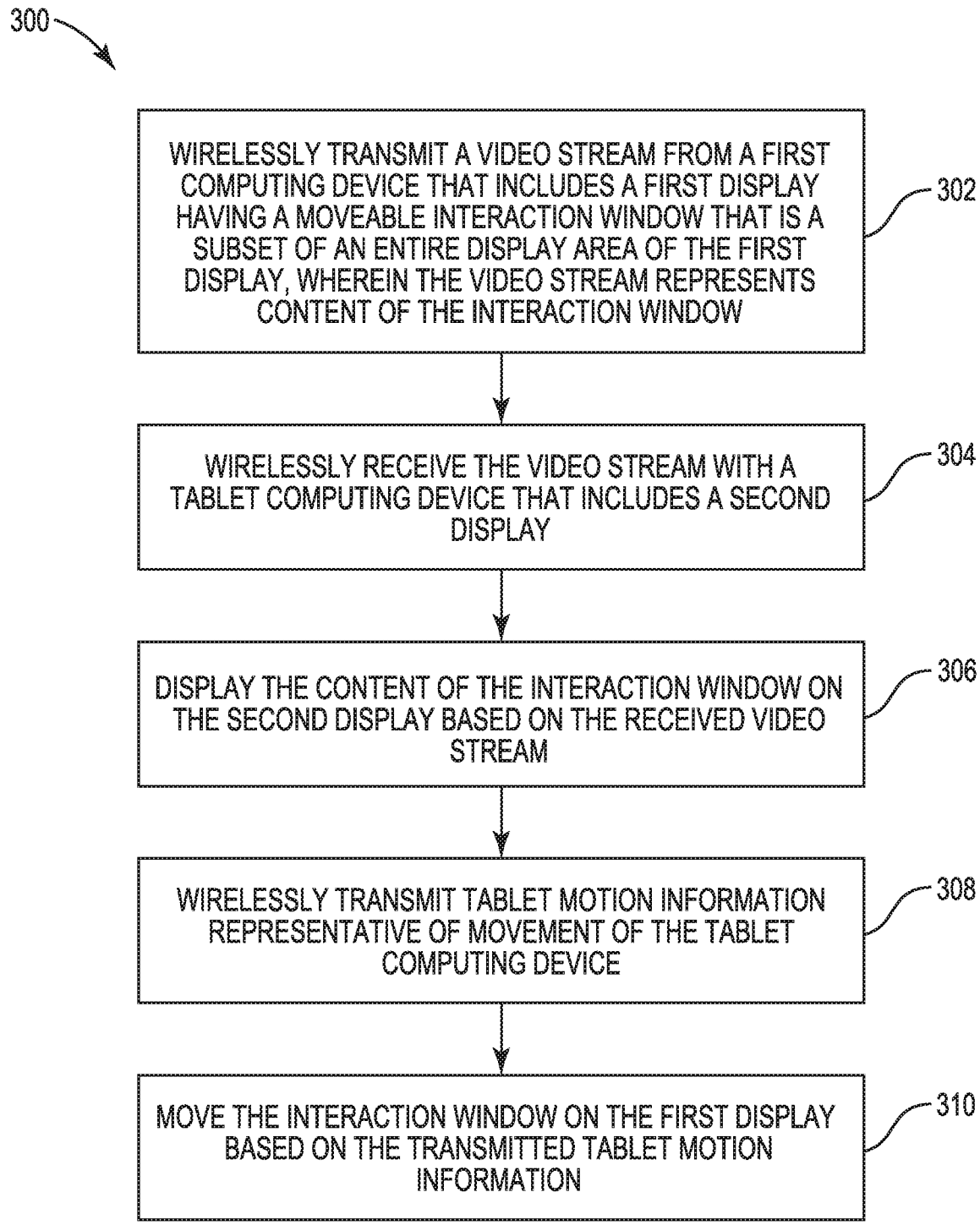
FIG. 3 is a flow diagram illustrating a method of causing movement of an interaction window with a tablet computing device according to one example.

Yet another example is directed to a method. FIG. 3 is a flow diagram illustrating a method 300 of causing movement of an interaction window with a tablet computing device according to one example. At 302 in method 300, a video stream is wirelessly transmitted from a first computing device that includes a first display having a moveable interaction window that is a subset of an entire display area of the first display, wherein the video stream represents content of the interaction window. At 304, the video stream is wirelessly received with a tablet computing device that includes a second display. At 306, the content of the interaction window is displayed on the second display based on the received video stream. At 308, tablet motion information representative of movement of the tablet computing device is wirelessly transmitted. At 310, the interaction window is moved on the first display based on the transmitted tablet motion information.

In an example of method 300, the tablet motion information may include sliding motion information and rotational motion information, and the method may further include sliding and rotating the interaction window on the first display based on the transmitted tablet motion information.

Although specific examples have been described above, the interaction techniques described herein may be applied to any lower resolution screen whose movement can be sensed and translated into position updates of an interaction window on a higher resolution display.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A computing system, comprising:
   a first computing device including a first display having a moveable interaction window that is a subset of an entire display area of the first display, the first computing device to wirelessly transmit a video stream representing content on the first display located within the interaction window; and
   a tablet computing device including a second display, the tablet computing device to wirelessly receive the video stream and display the content located within the interaction window on the second display and cause movement of the interaction window on the first display based on movement of the tablet computing device, wherein the tablet computing device senses sliding movement of the tablet computing device against a surface, wherein the tablet computing device causes sliding movement of the interaction window on the first display based on the sensed sliding movement, wherein the tablet computing device includes a sensor to sense any rotational movement of the tablet computing device including small rotations of less than 90 degrees and large rotations of 90 degrees or more, wherein the tablet computing device causes rotational movement of the interaction window on the first display based on the sensed rotational movement, and wherein the first computing device updates content of the video stream being transmitted based on the sliding and rotational movement of the interaction window.

2. The computing system of claim 1, wherein the first display includes a plurality of separate display units, and wherein the interaction window is moveable between the separate display units.

3. The computing system of claim 1, wherein the tablet computing device wirelessly transmits display resolution information to the first computing device, wherein the display resolution information indicates a resolution of the second display.

4. The computing system of claim 3, wherein the first computing device performs a screen scraping operation on a portion of the first display based on the transmitted display resolution information.

5. The computing system of claim 1, wherein the tablet computing device receives a pen input at a location on the second display, and wirelessly transmits a pen input event for a corresponding location in the interaction window to the first computing device.

6. The computing system of claim 1, wherein the tablet computing device includes a sensor to sense the movement of the tablet computing device, and wherein the tablet computing device wirelessly transmits tablet motion events to the first computing device based on the sensed movement.

7. The computing system of claim 1, wherein sensed rotational movements below a threshold amount cause no rotational movement of the interaction window.

8. The computing system of claim 1, wherein sensed rotational movements above a threshold amount cause the interaction window to switch between a landscape mode and a portrait mode.

9. The computing system of claim 1, wherein the first computing device is operable independently of the tablet computing device in that the first computing device runs computer programs separately from the tablet computing device, and wherein the first computing device is external to and separate from the tablet computing device.

10. The computing system of claim 1, wherein the small rotations cause an equal rotational movement of the interaction window.

11. A tablet computing device, comprising:
    a wireless communication module to wirelessly receive a video stream representing content located within an interaction window portion of a display of a first computing device;
    a display to display the content located within the interaction window based on the received video stream; and
    at least one sensor to sense movement of the tablet computing device, wherein the wireless communication module transmits tablet motion information to the first computing device based on the sensed movement to control movement of the interaction window portion of the display of the first computing device, wherein the at least one sensor senses sliding movement of the tablet computing device against a surface, wherein the wireless communication module transmits the tablet motion information to the first computing device based on the sensed sliding movement to control sliding movement of the interaction window portion of the display of the first computing device, wherein the at least one sensor senses any rotational movement of the tablet computing device including small rotations of less than 90 degrees and large rotations of 90 degrees or more, wherein the wireless communication module transmits the tablet motion information to the first computing device based on the sensed rotational movement to control rotational movement of the interaction window portion of the display of the first computing device, and wherein the wireless communication module wirelessly receives updated content in the video stream based on the sliding and rotational movement of the interaction window.

12. The tablet computing device of claim 11, wherein the small rotations cause an equal rotational movement of the interaction window.

13. A method, comprising:
    wirelessly transmitting a video stream from a first computing device that includes a first display having a moveable interaction window that is a subset of an entire display area of the first display, wherein the video stream represents content of the interaction window;
    wirelessly receiving the video stream with a tablet computing device that includes a second display;
    displaying the content of the interaction window on the second display based on the received video stream;
    wirelessly transmitting tablet motion information representative of movement of the tablet computing device;
    moving the interaction window on the first display based on the transmitted tablet motion information, wherein the tablet motion information includes sliding motion information representative of sliding movement of the tablet computing device against a surface, wherein moving the interaction window includes sliding the interaction window on the first display based on the transmitted tablet motion information, wherein the tablet motion information includes rotational motion information representative of any rotational movement of the tablet computing device including small rotations of less than 90 degrees and large rotations of 90 degrees or more, and wherein moving the interaction window includes rotating the interaction window on the first display based on the transmitted tablet motion information; and updating content of the video stream being transmitted based on the sliding and rotating of the interaction window.

14. The method of claim 13, wherein the small rotations cause an equal rotational movement of the interaction window.

\* \* \* \* \*